(12) United States Patent
Kim et al.

(10) Patent No.: US 10,336,189 B2
(45) Date of Patent: Jul. 2, 2019

(54) POLARIZER PLATE AND DISPLAY DEVICE INCLUDING THE SAME

(71) Applicant: SAMSUNG DISPLAY CO., LTD., Yongin, Gyeonggi-do (KR)

(72) Inventors: Sang Jae Kim, Seoul (KR); Kwang Hyun Kim, Gyeonggi-do (KR); Seon Ah Cho, Busan (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 482 days.

(21) Appl. No.: 14/732,495

(22) Filed: Jun. 5, 2015

(65) Prior Publication Data

US 2016/0216426 A1  Jul. 28, 2016

(30) Foreign Application Priority Data

Jan. 27, 2015  (KR) .................. 10-2015-0012599

(51) Int. Cl.
| | | |
|---|---|---|
| *G02B 5/30* | (2006.01) | |
| *B60K 35/00* | (2006.01) | |
| *G01C 21/36* | (2006.01) | |
| *G02B 27/28* | (2006.01) | |

(52) U.S. Cl.
CPC .............. *B60K 35/00* (2013.01); *G01C 21/36* (2013.01); *G02B 5/3041* (2013.01); *B60K 2350/1004* (2013.01); *B60K 2350/352* (2013.01)

(58) Field of Classification Search
CPC ........... G02F 1/133528; G02F 2202/28; G02F 1/133512; G02F 2201/50; G02F 1/13338; G02F 1/133502; G02F 1/13363; G02F 1/133308; G02F 2001/13312; G02F 2001/133538; G02F 1/1333; G02F 1/133514; G02F 1/133
See application file for complete search history.

(56) References Cited

U.S. PATENT DOCUMENTS

| | | | | |
|---|---|---|---|---|
| 2004/0179165 A1* | 9/2004 | Kinoshita | ......... | G02F 1/133305 349/158 |
| 2010/0227104 A1* | 9/2010 | Yokouchi | ............ | B29C 65/5042 428/41.8 |
| 2011/0176092 A1* | 7/2011 | Iida | ....................... | C08G 63/193 349/96 |
| 2012/0106063 A1* | 5/2012 | Mathew | ............ | G02F 1/133528 361/679.21 |
| 2014/0242302 A1* | 8/2014 | Nojiri | ............... | G02F 1/133528 428/1.55 |

FOREIGN PATENT DOCUMENTS

| | | |
|---|---|---|
| JP | 2006-106016 | 4/2006 |
| KR | 1020100066380 | 6/2010 |
| KR | 1020140087750 | 7/2014 |
| WO | WO/2011/016572 | 2/2011 |
| WO | WO/2012/014639 | 2/2012 |

* cited by examiner

*Primary Examiner* — Thomas K Pham
*Assistant Examiner* — Sharrief I Broome
(74) *Attorney, Agent, or Firm* — F. Chau & Associates, LLC

(57) ABSTRACT

A polarizer plate includes a base film, an adhesive layer disposed on one surface of the base film, a polarizer protection film disposed on one surface of the adhesive layer, a polarizer disposed on one surface of the polarizer protection film, and a cutting line formed perpendicular to the surface of the base film and configured to divide the polarizer protection film and the polarizer into separate regions.

6 Claims, 28 Drawing Sheets

POLARIZER PLATE AND DISPLAY DEVICE INCLUDING THE SAME

CROSS-REFERENCE TO RELATED APPLICATIONS

This application claims priority under 35 U.S.C. § 119 from Korean Patent Application No. 10-2015-0012599, filed on Jan. 27, 2015, in the Korean Intellectual Property Office, and all the benefits accruing therefrom, the contents of which are herein incorporated by reference in their entirety.

BACKGROUND

1. Technical Field

Embodiments of the present disclosure are directed to a polarizer plate and a display device including the same.

2. Discussion of the Related Art

With the rapid development of flat panel display fields, various flat panel displays that are thinner, lighter, and have lower power consumption have been developed to substitute for the existing cathode ray tubes (CRTs).

Examples of such flat panel displays include a liquid crystal display LCD), a plasma display panel (PDP), a field emission display (FED), and an organic light emitting display (OLED).

Of these, liquid crystal displays (LCD) are one of most widely used flat panel displays. In general, a liquid crystal display includes a liquid crystal panel in which a liquid crystal layer is sealed between a thin film transistor (TFT) array substrate and a color filter substrate, and that includes polarizer plates are arranged on upper and lower portions thereof. Accordingly, only specific polarized light can pass through the polarizer plates to display a desired image.

Further, an organic light emitting display (OLED) may include a display panel that has an organic light emitting layer, and in general, polarizer plates are arranged on visually recognizable sides of the display panel to prevent reflection of external light.

On the other hand, a display device may include a display region on which an image is displayed and a non-display region on which no image is displayed. ways of minimizing the non-display region, i.e., a bezel region, have been studied.

SUMMARY

Accordingly, embodiments of the present disclosure can provide a polarizer plate and a display device including the same, which can minimize a non-display region of the display device.

Embodiments of the present disclosure can also provide a polarizer plate which can provide a display device having a superior external appearance.

According to an exemplary embodiment of the disclosure, there is provided a polarizer plate that includes a base film, an adhesive layer disposed on one surface of the base film, a polarizer protection film disposed on one surface of the adhesive layer, a polarizer disposed on one surface of the polarizer protection film, and a cutting line formed perpendicular to the surface of the base film and configured to divide the polarizer protection film and the polarizer into separate regions.

The polarizer plate may further comprise a groove line formed on at least one surface of the base film opposite from the cutting line.

The cutting line may divide the polarizer protection film into a first polarizer protection film and a second polarizer protection film, and the cutting line may divide the polarizer into a first polarizer and a second polarizer that are divided by the cutting line.

The cutting line may divide the adhesive layer into separate regions.

The cutting line may divide the adhesive layer into a first adhesive layer and a second adhesive layer.

The polarizer plate may further comprise a third adhesive layer disposed on the other surface of the base film, and a polarizer plate protection film disposed on the other surface of the third adhesive layer, wherein side end portions of the third adhesive layer and the polarizer plate protection film may extend out from the cutting line.

According to another exemplary embodiment of the present disclosure, there is provided a polarizer plate that includes a base film, an adhesive layer disposed on one surface of the base film, a polarizer protection film disposed on one surface of the adhesive layer, and a polarizer disposed on one surface of the polarizer protection film, wherein the base film includes projection regions that extend out from a region covered by the polarizer.

The polarizer plate may further comprise a groove line formed on at least one surface of the base film opposite from a side wall of the polarizer protection film.

The polarizer protection film may comprise four sides, and the projection regions of the base film may extend from at least two sides of the polarizer protection film The projection regions of the base film may extend from opposite sides of the polarizer protection film The projection regions of the base film may extend from both side surfaces in a polarization axis direction of the polarizer The projection regions of the base film may extend from the four sides of the polarizer protection film.

The base film may be formed of a material transparent to light in a first wavelength range, and the polarizer protection film and the polarizer may be formed of a material that absorbs light in the first wavelength range.

According to another exemplary embodiment of the present disclosure, there is provided a display device, including: a display panel that includes a display region, a polarizer plate positioned on an upper portion of the display panel, and a case positioned below the display panel to accommodate the display panel, wherein the polarizer plate includes a base film, an adhesive layer disposed on the base film, a polarizer protection film disposed on the adhesive layer, and a polarizer disposed on the polarizer protection film, wherein the base film includes projection regions that extend out from a region covered by the polarizer, and wherein the projection regions cover side portions of the polarizer protection film and the polarizer.

The projection regions may cover side portions of the display panel.

The projection regions may be attached to the case.

The base film may be attached to the case by the adhesive layer on the projection regions.

The projection regions may be attached to a lower surface of the case.

The projection regions may be spaced apart from the display panel.

The display device may further comprise a groove line in at least one surface of the base film opposite from a side wall of the display panel, wherein the projection regions of the base film may be bent around the groove line as a boundary toward the case.

According to the present disclosure, a polarizer and a display device including the same, which can minimize the non-display region of the display device, can be provided.

Further, a display device having a superior external appearance can be provided.

DETAILED DESCRIPTION OF EXEMPLARY EMBODIMENTS

Figure 1:
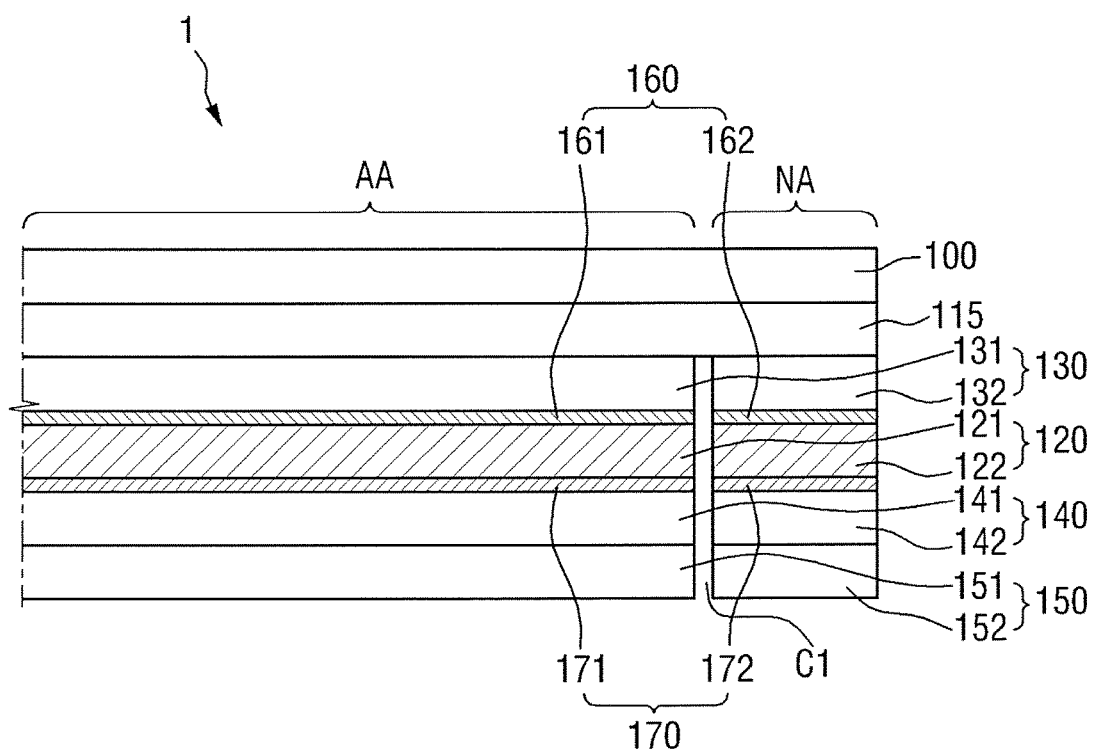
FIG. 1 is a cross-sectional view of a polarizer plate according to an embodiment of the present disclosure.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. In the entire description of the present disclosure, the same reference numerals may used for the same elements across various figures. In the drawings, sizes and relative sizes of layers and areas may be exaggerated for clarity of explanation.

The term "on" that may be used to designate that an element is on another element located on a different layer or a layer includes both a case where an element is located directly on another element or a layer and a case where an element is located on another element via another layer or still another element.

Hereinafter, embodiments of the present disclosure will be described with reference to the accompanying drawings.

FIG. 1 is a cross-sectional view of a polarizer plate according to an embodiment of the present disclosure.

Referring to FIG. 1, a polarizer plate according to an embodiment may include a base film 100, an adhesive layer 115 disposed on one surface of the base film 100, a polarizer protection film 130 disposed on one surface of the adhesive layer 115, and a polarizer 120 disposed on one surface of the polarizer protection film 130.

The base film 100 may be formed of a general plastic material, and may be, for example, a triacetyl cellulose (TAC) film, a cyclo olefin polymer (COP) film, or a polyethylene terephthalate (PET) film, but embodiments are not limited thereto. Although to be described below, the base film 100 may absorb light of different wavelength bands depending on the components of the material that forms the base film 100, and accordingly, by irradiating the base film 100 with light of a wavelength band that is not absorbed by that material, the base film 100 can be prevented from being cut on a portion onto which light is irradiated.

The adhesive layer 115 may be disposed on one surface of the base film 100, and may adhere to the polarizer protection film 130. In the case where the polarizer plate is part of a display device to be described below, the adhesive layer 115 may adhere to a case, etc.

The polarizer protection film 130 may be disposed on one surface of the adhesive layer 115. The polarizer protection film 130 can protect the polarizer against permeation of external oxygen or moisture. The polarizer protection film 130 may be any polarizer protection film that is typically used in the art to which the present disclosure pertains, and thus a detailed description thereof will be omitted.

The polarizer 120 may be disposed on one surface of the polarizer protection film 130, and an adhesive layer 160 may be disposed between the polarizer protection film 130 and the polarizer 120 to make them adhere to each other. Further, a polarizer protection film 140 may be additionally disposed on another surface of the polarizer 120, and in this case, an adhesive layer 170 may be disposed between the polarizer protection film 140 and the polarizer 120 to make the polarizer 120 and the polarizer protection film 140 adhere to each other. That is, the polarizer 120 may be interposed between the polarizer protection films 130 and 140, and the adhesive layers 160 and 170 may be respectively interposed between the polarizer 120 and the polarizer protection films 130 and 140. However, according to circumstances, the polarization protection film 140 that is disposed on another surface of the polarizer 120 may be omitted to achieve a thinner polarizer plate.

The adhesive layers 160 and 170 may be water-based adhesives or acrylic adhesives, which are typically used in the art to which the present disclosure pertains, but are not limited thereto. Since the components that constitute the adhesive layers 160 and 170 are well known in the art, a detailed description thereof will be omitted.

The polarizer 120 permits light of specific polarizations to pass through the polarizer 120, and may comprise, for example, iodine or dichroic dyes that are dyed and cross-linked on a polyvinyl alcohol based film and drawn in one axial direction or in biaxial directions, but embodiments are not limited thereto. A method for manufacturing the polarizer 120 may include, for example, manufacturing the polyvinyl alcohol based film through dyeing, crosslinking, drawing, and swelling processes. The dyeing, crosslinking, and drawing processes may be performed directly on the polyvinyl alcohol based film, or the dyeing, crosslinking, and drawing processes may be performed using a base film. Since these processes are well known in the art to which the present disclosure pertains, a detailed description thereof will be omitted.

In addition, adhesives 150 for attaching the polarizer plate 1 onto a display panel may be additionally formed on one surface of the polarizer protection film 140. If the polarizer protection film 140 is omitted from the polarizer 120, a barrier layer may be formed on a surface of the polarizer 120, and the adhesives 150 may be formed on one surface of the barrier layer.

The arrangement of the respective layers that form the polarizer plate 1 will be described in more detail with reference to FIG. 1. The polarizer plate 1 may be configured so that the base film 100, the adhesive layer 115, the polarizer protection film 130, the polarizer 120, the polarizer protection film 140, and the adhesives 150 are successively disposed, and the adhesive layers 160 and 170 may be respectively positioned between the polarizer protection films 130 and 140 and the polarizer 120.

On the other hand, the polarizer plate 1 may include a cutting line C1 formed perpendicular to a surface of the base film 100 that divides the polarizer protection film 130 and the polarizer 120 into separate regions.

The cutting line C1 may be formed in a laminating direction in which the base film 100, the adhesive layer 115, the polarizer protection film 130, the polarizer 120, the polarizer protection film 140, and the adhesives 150 are successively laminated, and particularly in a direction that is substantially perpendicular to a surface of the base film 100, but embodiments are not limited thereto. The cutting line C1 may be inclined at a predetermined angle with respect to a direction perpendicular to the surface of the base film 100.

The cutting line C1 may divide the polarizer protection film 130 and the polarizer 120 that is positioned on one surface of the polarizer protection film 130. In addition, in the case where there is a polarizer protection film 140 positioned on another surface of the polarizer 120, the cutting line C1 may also divide the polarizer protection film 140 and the adhesive layers 160 and 170 formed between the polarizer protection films 130 and 140 and the polarizer 120. Further, in the case where the adhesives 150 are formed, the cutting line C1 may also divide the adhesives 150. That is, the cutting line C1 may divide other layers except for the base film 100 and the adhesive layer 115.

The cutting line C1 will be described in more detail. The polarizer protection film 130 may include a first polarizer protection film 131 and a second polarizer protection film 132 that are divided by the cutting line C1, and the polarizer may include a first polarizer 121 and a second polarizer 122 that are divided by the cutting line. Further, in the case where the polarizer protection film 140 and the adhesives 150 are additionally formed on one surface of the polarizer 120, they may be divided into first and second polarizer protection films 141 and 142 and first and second adhesives 151 and 152, respectively. Further, the cutting line C1 may divide the adhesive layers 160 and 170 into first adhesives 161 and 171 and second adhesives 162 and 172.

The polarizer plate may include a first region AA and a second region NA. The first region AA may be a display region, and the second region NA may be a non-display or projection region. The first region AA may be a portion that adheres to a display region of a display panel in a display device, and the second region NA may be a portion that adheres to a non-display region portion. Although the cross-sectional view of FIG. 1 shows the second region NA as being positioned on the right side of the horizontal surface of the polarizer plate 1, the second region NA may be formed on the left side, the upper side, and the lower side of the horizontal surface of the polarizer plate 1.

For convenience of explanation, if it is assumed that the first polarizer protection films 131 and 141, the first polarizer 121, the first adhesive layers 161 and 171, and the first adhesives 151 are positioned on the first region AA of the polarizer plate 1, and the second polarizer protection films 132 and 142, the second polarizer 122, the second adhesive layers 162 and 172, and the first adhesives 152 are positioned on the second region NA of the polarizer plate 1, then the elements which are positioned on the second region NA may be removed when they are subsequently applied to the display device.

Further, in the case where the adhesive layers 160 and 170 are included on one or both surfaces of the polarizer 120, the adhesive layer 115 may have a smaller adhesive force than the adhesive force of the adhesive layers 160 and 170. Accordingly, in the case where the polarizer plate 1 is applied to the display device, it may be positioned on the adhesive layer 115, and the elements on the second region NA divided by the cutting line C1 may be easily removed. Since the adhesive force of the adhesive layer 115 is smaller than the adhesive force of the adhesive layers 160 and 170, the elements on the second region NA may be easily separated from the adhesive layer 115 when the elements are together attached to the second region NA. Accordingly, by removing elements on the second region NA, the base film 100 can be prevented from being damaged.

The base film 100 may be formed of a material through which light in a first wavelength range can selectively pass, and the polarizer protection film 130 and the polarizer 120 may be formed of a material that absorbs light in the first wavelength range.

That is, a wavelength range of light that can be absorbed by the base film 100 may be different from the wavelength range of light that can be absorbed by the polarizer protection film 130 and the polarizer 120. More specifically, the wavelength range of light that can be absorbed by the base film 100 may differ from the wavelength range of the light that can be absorbed by the polarizer protection film 130, the polarizer 120, and the adhesive layers 160 and 170. Accordingly, in a process of forming the cutting line C1 on the polarizer plate, the cutting line C1 may not be actually formed on the base film 100, but may be formed on other elements.

In other words, as described below, by irradiating light of a specific wavelength through UV or laser irradiation after forming the above-described laminated polarizer plate in the process of manufacturing the polarizer plate, the cutting line C1 may be formed on a boundary between the first region AA and the second region NA, and the cutting line C1 may be formed by heat that is generated through absorption of light of the specific wavelength. In this case, since the base film 100 does not absorb light of the specific wavelength, but allows the light to selectively pass therethrough, no cutting line C1 is formed, and thus the base film 100 may not be divided into the first region AA and the second region NA.

Figure 2:
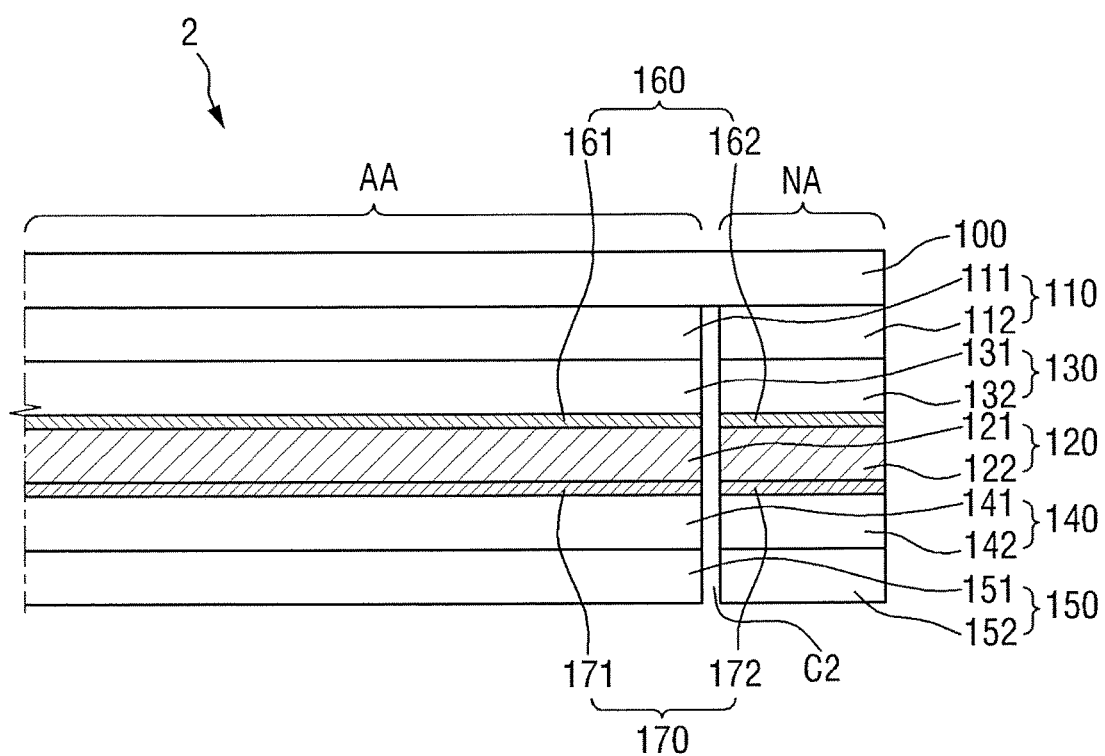
FIG. 2 is a cross-sectional view of a polarizer plate according to another embodiment of the present disclosure.

FIG. 2 is a cross-sectional view of a polarizer plate according to another embodiment of the present disclosure.

Referring to FIG. 2, on a polarizer plate 2, a cutting line C2 may divide adhesive layer 110 into separate regions. Accordingly, the adhesive layer 110 may include a first adhesive layer 111 and a second adhesive layer 112 that are divided by the cutting line. FIG. 2 illustrates that the adhesive layer is entirely cut by the cutting line C2, but embodiments are not limited thereto. The adhesive layer may be partially penetrated by a groove in a boundary portion between the first region AA and the second region NA of the polarizer plate 2. Since other elements that comprise the polarizer plate 2 have been described, a duplicate description thereof will be omitted.

Figure 3:
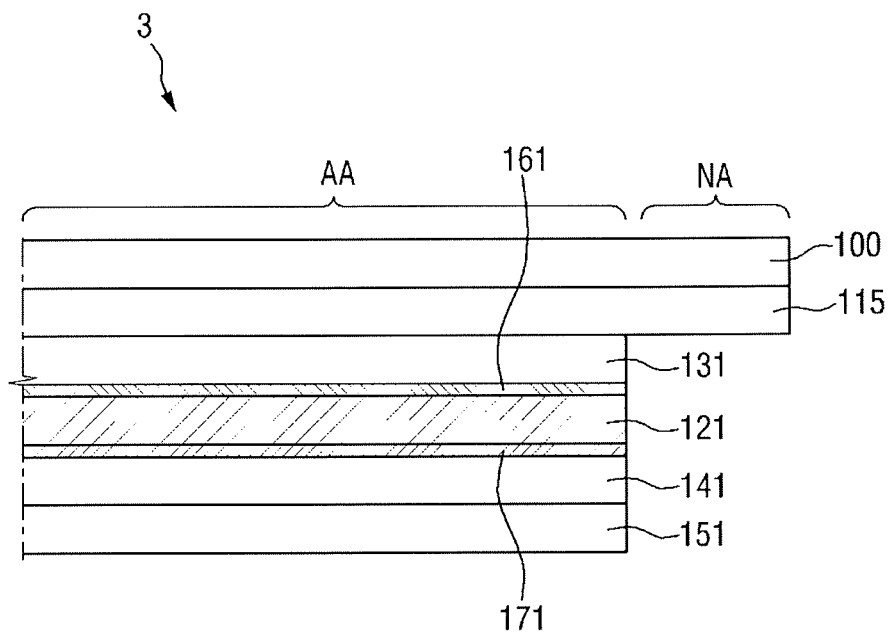
FIGS. 3 to 15 are cross-sectional views of a polarizer plate according to other embodiments of the present disclosure.

FIG. 3 is a cross-sectional view of a polarizer plate according to another embodiment of the present disclosure.

Referring to FIG. 3, a polarizer plate 3 may include the base film 100, the adhesive layer 115 disposed on one surface of the base film 100, the polarizer protection film 130 disposed on one surface of the adhesive layer 115, and the polarizer 120 disposed on one surface of the polarizer protection film 130, and the base film 100 may include projection regions that are not covered by the polarizer 120.

The polarizer plate 3 may include the first region AA and the second region NA, and the projection region may correspond to the second region NA. That is, in the case where the polarizer plate 3 is disposed on a display device, the projection region may correspond to a portion other than a display region of the display device.

In other words, an area of the base film 100 of the polarizer plate 3 may be wider than the area of the polarizer 121, and may include a region that does not overlap the polarizer 121. Such a non-overlapping region may be the projection region as described above. That is, the projection region of the base film 100 may be an region exposed by the polarizer 121.

Figure 4:
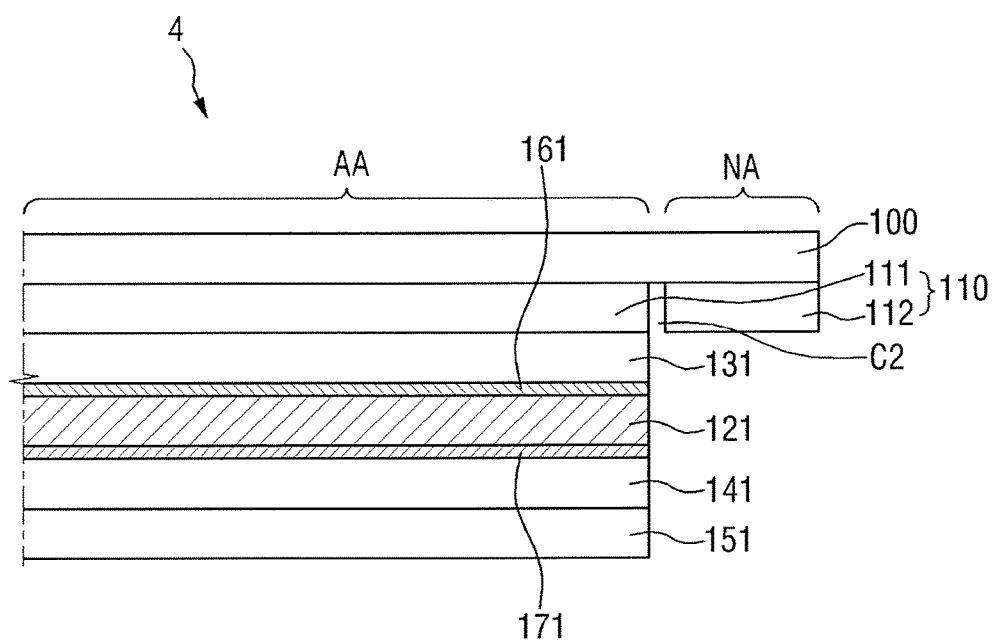

FIG. 4 is a cross-sectional view of a polarizer plate according to another embodiment of the present disclosure.

Referring to FIG. 4, the adhesive layer 110 of a polarizer plate 4 may be divided on by a boundary between a projection region and a non-projection region of the base film 100. That is, the adhesive layer 110 may be divided into the first adhesive layer 111 and the second adhesive layer 112 by the boundary. In other words, the boundary may correspond to a side of the polarizer 121, and the adhesive layer 110 may be divided into the first adhesive layer 111 in an overlapping portion and the second adhesive layer 112 in a projecting portion.

The polarizer plates 3 and 4 of FIGS. 3 and 4 differ from the polarizer plates 1 and 2 as described above with reference to FIGS. 1 and 2 in that elements below the adhesive layer in a position that corresponds to the second region NA of the polarizer plate have been removed.

Figure 5:
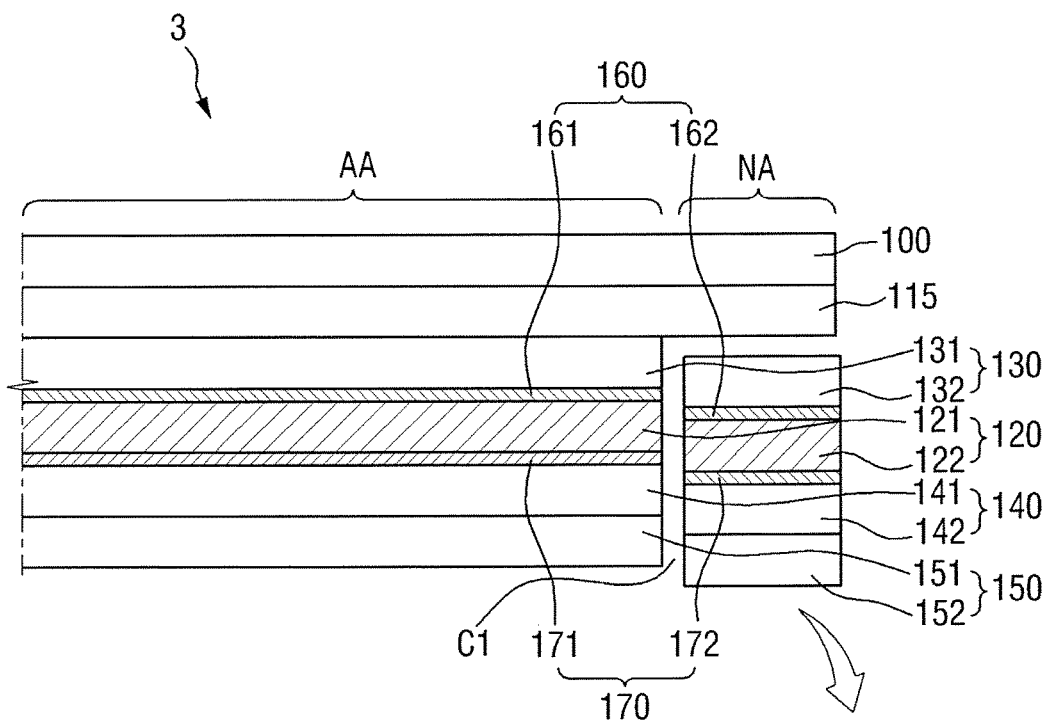
Figure 6:
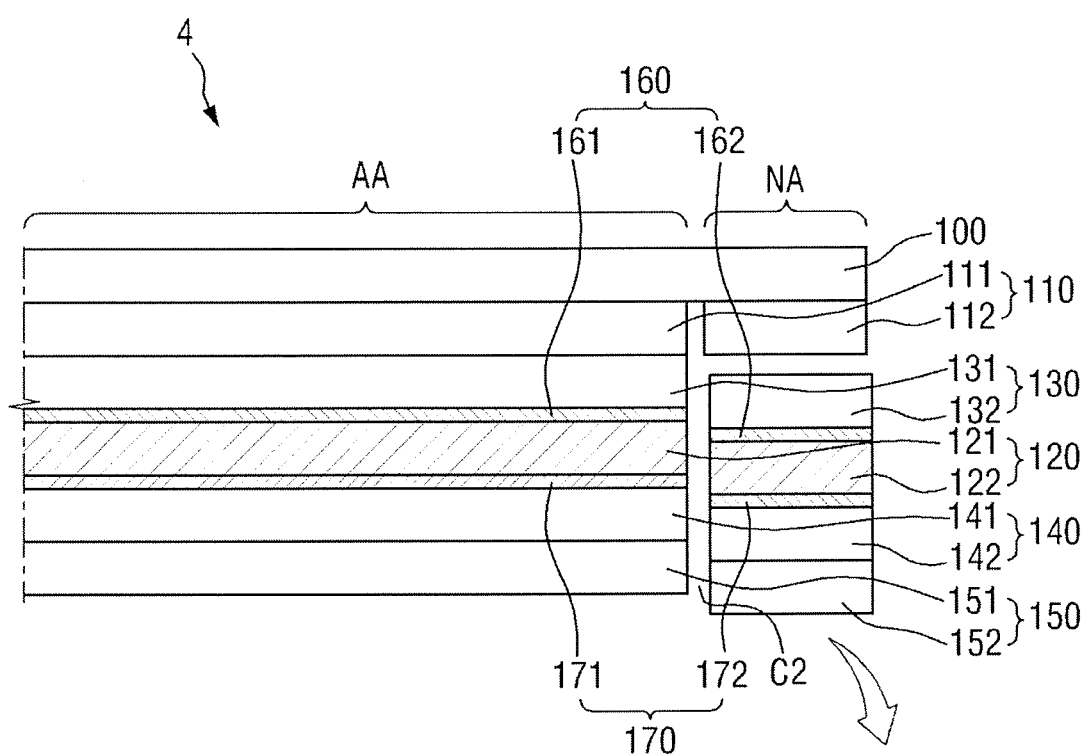

That is, as illustrated in FIG. 5, in the case where the elements below the adhesive layer 115 in the second region NA of the polarizer plate 1 of FIG. 1 have been removed, the polarizer plate 3 as illustrated in FIG. 3 may be provided. Further, as illustrated in FIG. 6, in the case where the elements below the adhesive layer 110 in the second region NA of the polarizer plate 2 of FIG. 2 have been removed, the polarizer plate 4 as illustrated in FIG. 4 may be provided. Since other configurations have already been described, the duplicate description thereof will be omitted.

Figure 7:
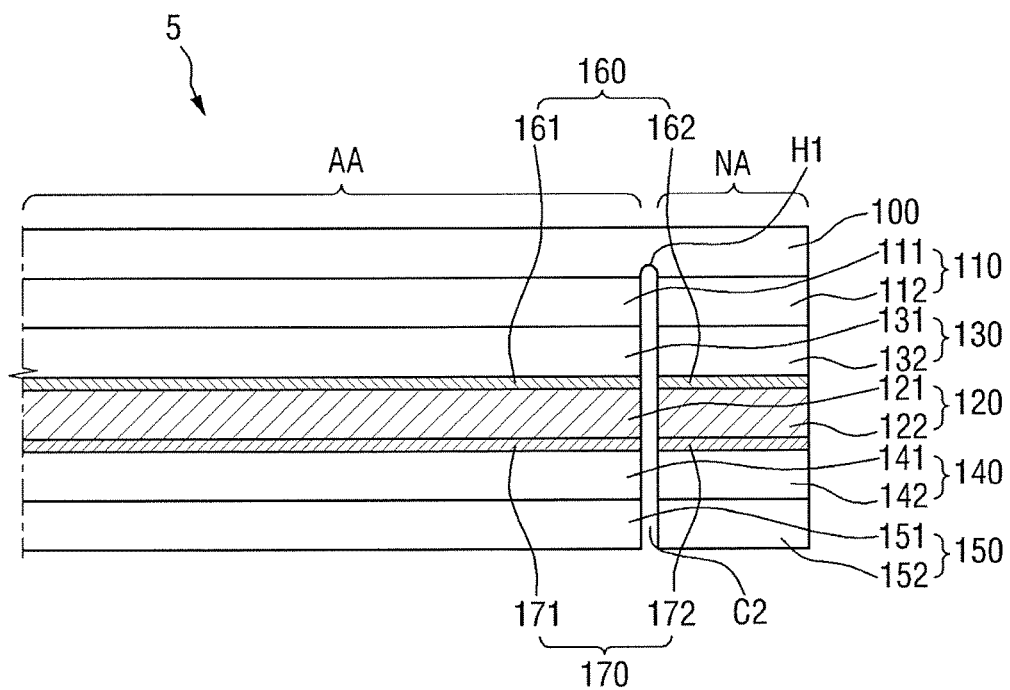

FIG. 7 is a cross-section of a polarizer plate according to another embodiment of the present disclosure.

As illustrated in FIG. 7, a polarizer plate 5 may further include a groove line H1 formed on at least one surface of the base film 100 in a position that is opposite from the cutting line C2. The groove line H1 may correspond to the position where the cutting line C2 is formed, but embodiments are not limited thereto. For example, the groove line H1 may be formed on a position that does not correspond to the cutting line C2. That is, the groove line H1 may be formed on a position that partially corresponds to the cutting line C2. The groove line H1 may be a groove that is partially recessed inside of the base film 100, and may extend along the cutting line C2 on the horizontal surface of the base film 100. Further, the groove line H1 may be formed where other elements, such as the polarizer protection film 130, are formed on the base film 100.

Figure 8:
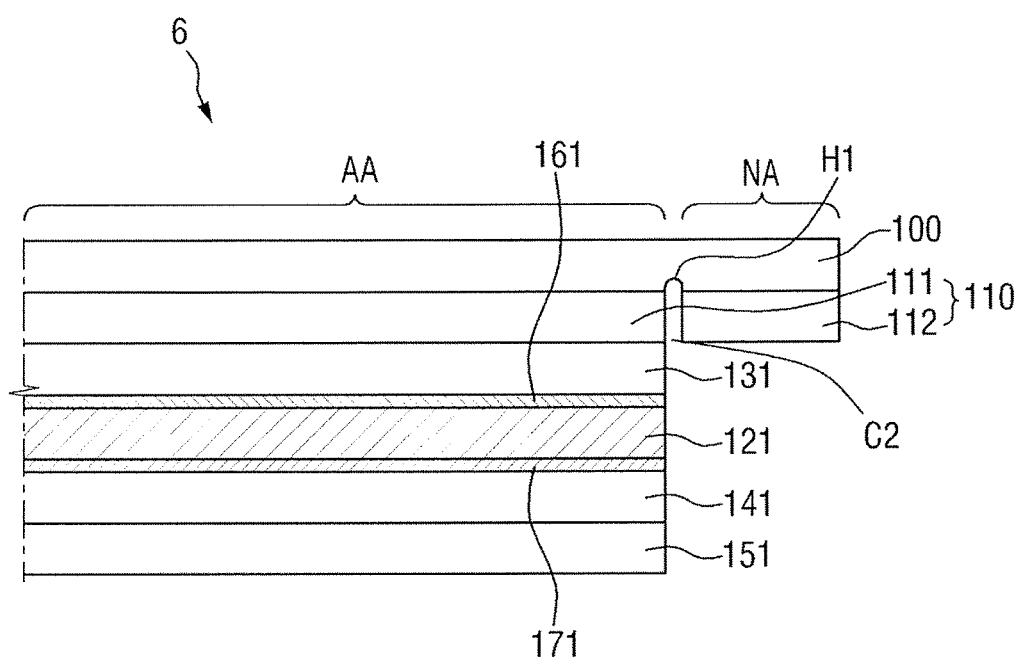

FIG. 8 is a cross-sectional view of a polarizer plate 6 in a state where other elements below the adhesive layer 110 in a region that corresponds to the second region NA of the polarizer plate 5 of FIG. 7 have been removed. Referring to FIG. 8, the groove line H1 may be formed on the boundary between the projection region and the non-projection region of the base film 100. That is, the groove line H1 may be formed on the boundary between the first region AA and the second region NA of the base film 100, and more specifically, may correspond to or be opposite from side walls of the polarizer protection film 131.

On the other hand, since the groove line H1 is included on the base film 100 as described above, the projection regions may bend when the polarizer plate is disposed on the display device.

Figure 9:
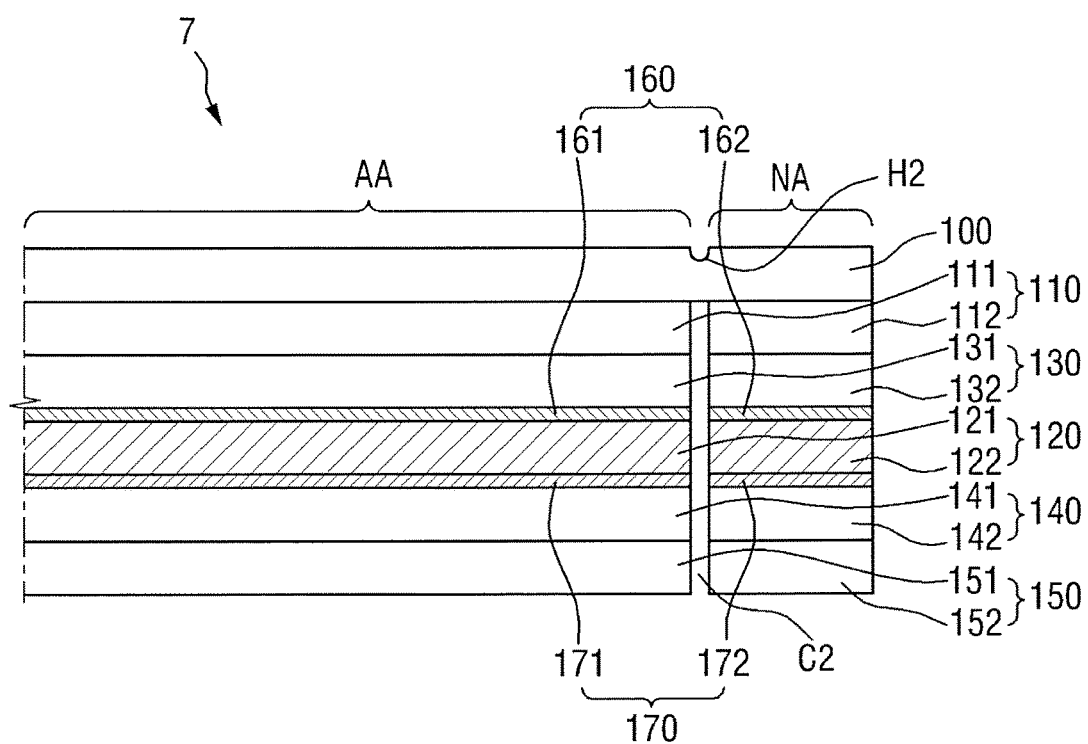
Figure 10:
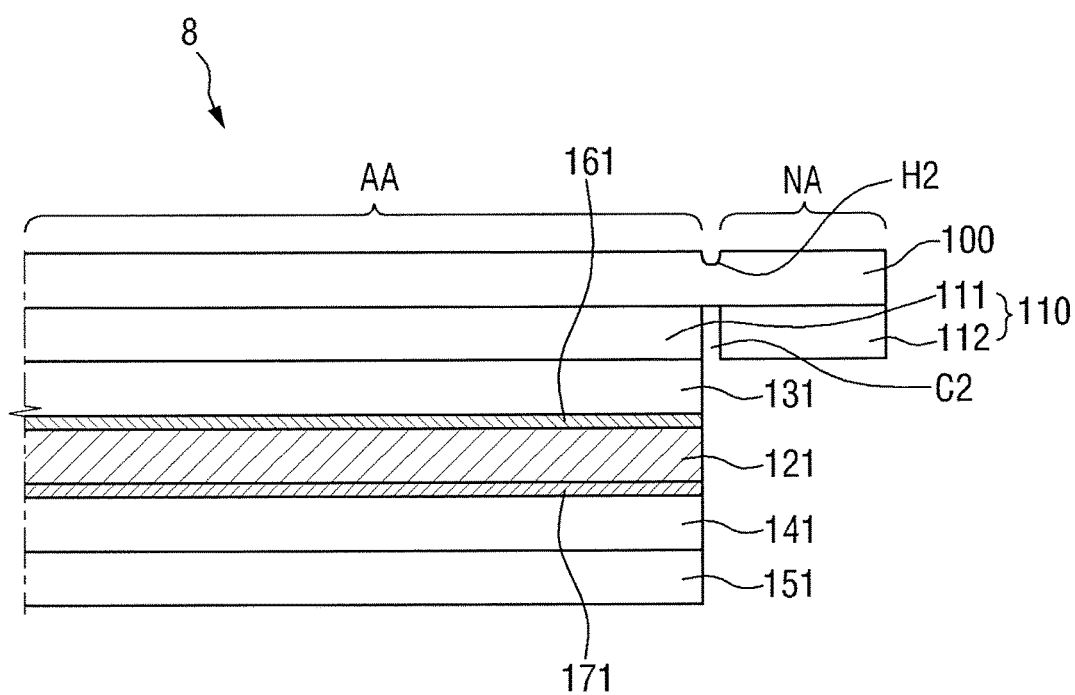

FIG. 9 is a cross-sectional of a polarizer plate 7 according to another embodiment of the present disclosure, and FIG. 10 is a cross-sectional view of a polarizer plate 8 when elements below the adhesive layer 110 in the second region NA of the polarizer plate 7 of FIG. 9 have been removed. Referring to FIGS. 9 and 10, the polarizer plates 7 and 8 may include a groove line H2 that is formed on the other surface of the base film 100. That is, the groove line H2 may be formed on a surface that is opposite to the surface on which other elements, such as the polarizer protection film 131, are formed on the base film 100.

Figure 11:
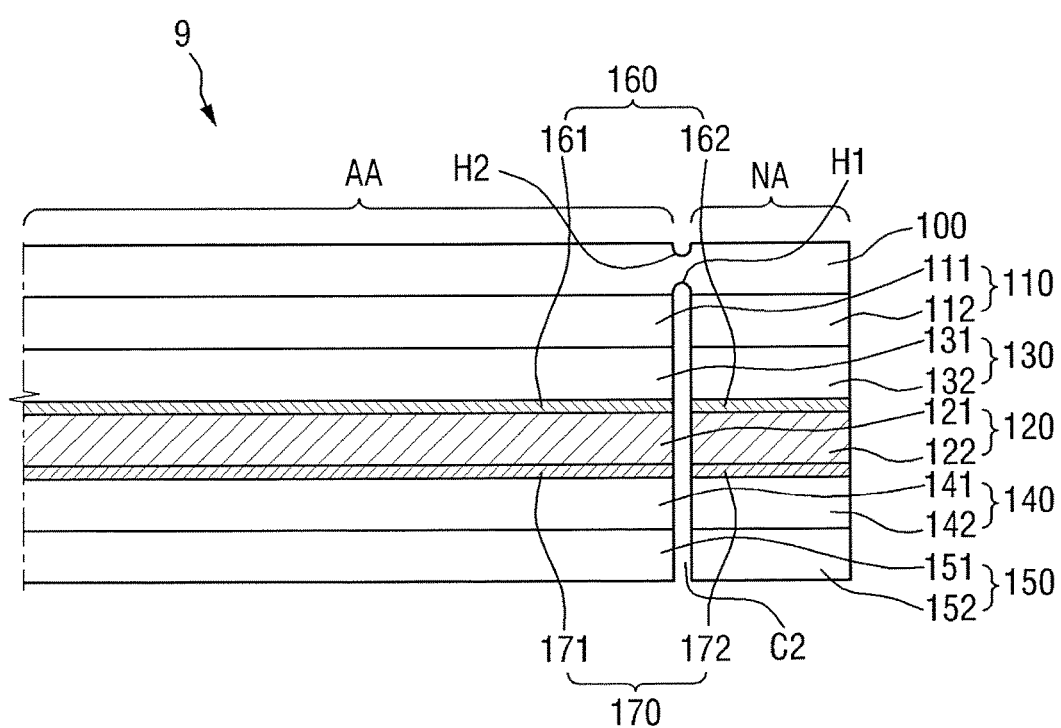
Figure 12:
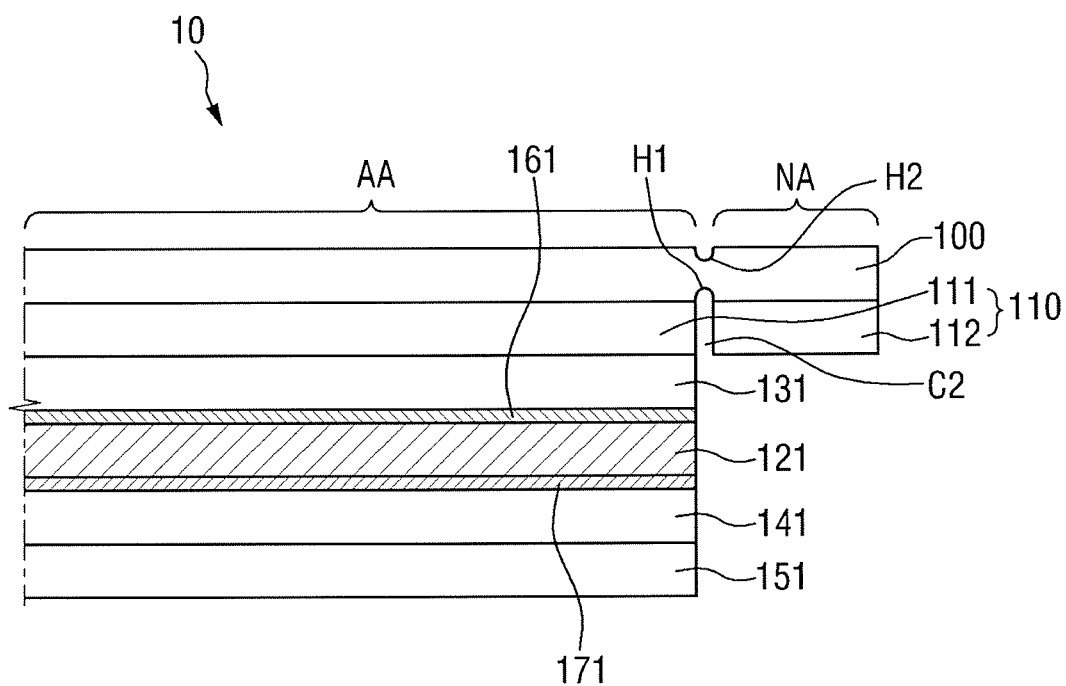

FIG. 11 is a cross-sectional of a polarizer plate 9 according to another embodiment of the present disclosure, and FIG. 12 is a cross-sectional view of a polarizer plate 10 when other elements below the adhesive layer 110 in the second region NA of the polarizer plate 9 of FIG. 11 have been removed. Referring to FIGS. 11 and 12, the polarizer plates 9 and 10 may include groove lines H1 and H2 formed on both surfaces of the base film 100 opposite from each other. That is, the groove lines H1 and H2 on both surfaces may correspond to and be opposite from the side wall of the polarizer protection film 131 on the base film 100.

Figure 13:
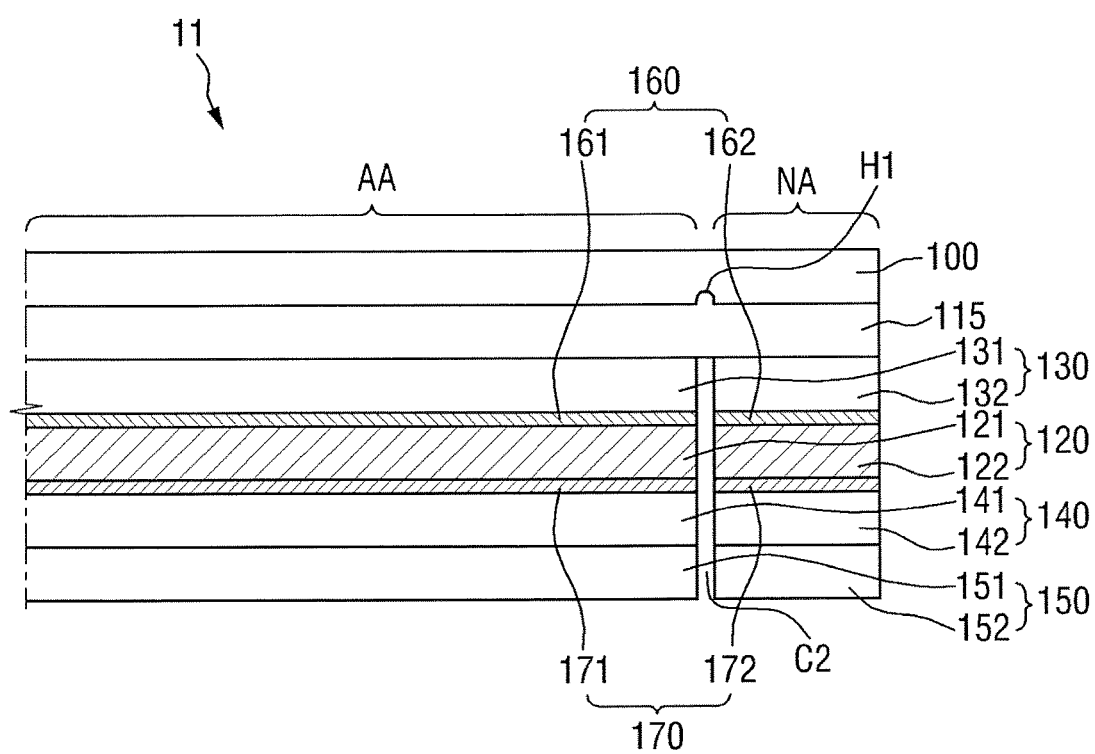
Figure 14:
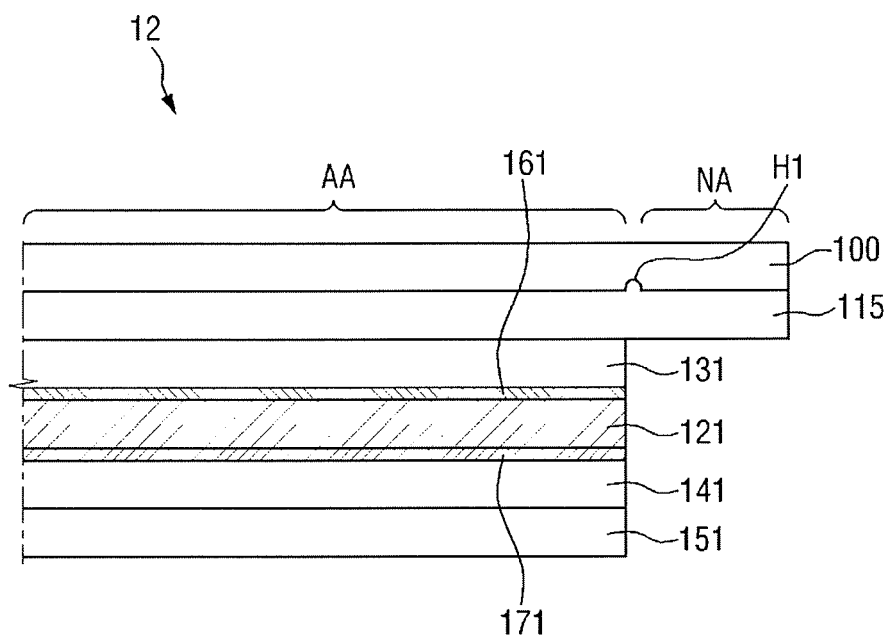

FIG. 13 is a cross-sectional of a polarizer plate 11 according to another embodiment of the present disclosure, and FIG. 14 is a cross-sectional view of a polarizer plate 12 when elements below the adhesive layer 110 in the second region NA of the polarizer plate 11 of FIG. 13 have been removed. That is, the polarizer plates 11 and 12 of FIGS. 13 and 14 have the same configurations as the configurations of the polarizer plates 1 and 3 of FIGS. 1 and 3 except that the groove line H1 is formed on the base film 100 of the polarizer plates 1 and 3 of FIGS. 1 and 3.

Since the adhesive layer 115 is not cut by the cutting line on the polarizer plates 11 and 12 of FIGS. 13 and 14, the adhesive layer 115 may be present in the first region AA and the second region NA, i.e., and thus a portion of the adhesive layer 115 may protrude into the groove line H1.

On the other hand, FIGS. 13 and 14 illustrate the groove line H1 formed on one surface of the base film 100 on the polarizer plates 1 and 3 of FIGS. 1 and 3, but embodiments are not limited thereto. The groove line may be formed on the other surface or on both surfaces of the base film 100.

Figure 15:
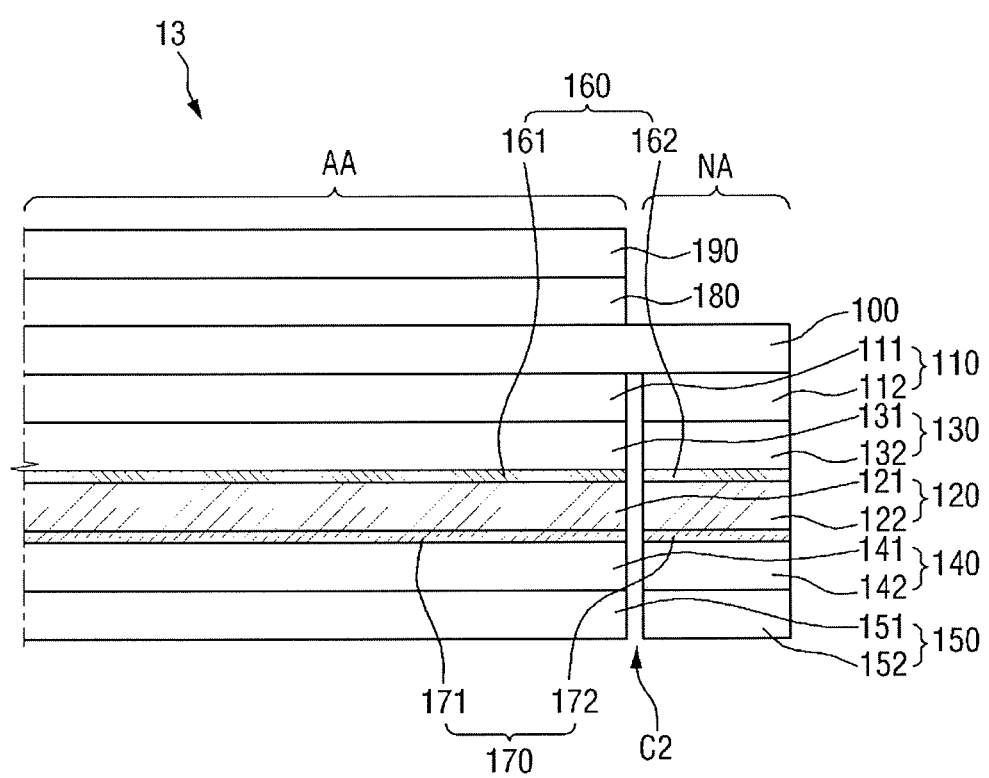

FIG. 15 illustrates a polarizer plate 13 according to another embodiment of the present disclosure. Referring to FIG. 15, the polarizer plate 13 may further include a third adhesive layer 180 disposed on the other surface of the base film 100 and a polarizer plate protection film 190 disposed on the third adhesive layer 180. Further, the boundary defined by side end portions, i.e., side walls, of the third adhesive layer 180 and the polarizer plate protection film 190 may correspond to the cutting line C2. In other words, the third adhesive layer 180 and the polarizer protection film 190 may be positioned substantially in the first region AA of the base film 100, and may correspond to a position where the first polarizer protection film 131 is formed.

When the polarizer plate protection film 190 is applied to the display device, it may prevent the base film 100 from being damaged. The polarizer plate protection film 190 may be a release paper that can be removed by a final consumer who uses the display device. Since the polarizer plate protection film 190 is formed in a position that corresponds to the first region AA as described above, it can be prevented from being peeled off from the base film 100 when the polarizer 13 is disposed in the display device and the second region NA of the base film is bent.

On the other hand, the polarizer plate protection film 190 and the third adhesive layer 180 as shown in FIG. 15 may be used with other configurations as described above in which the groove line is formed on the base film 100 or the adhesive layer is divided by the cutting line.

Figure 16:
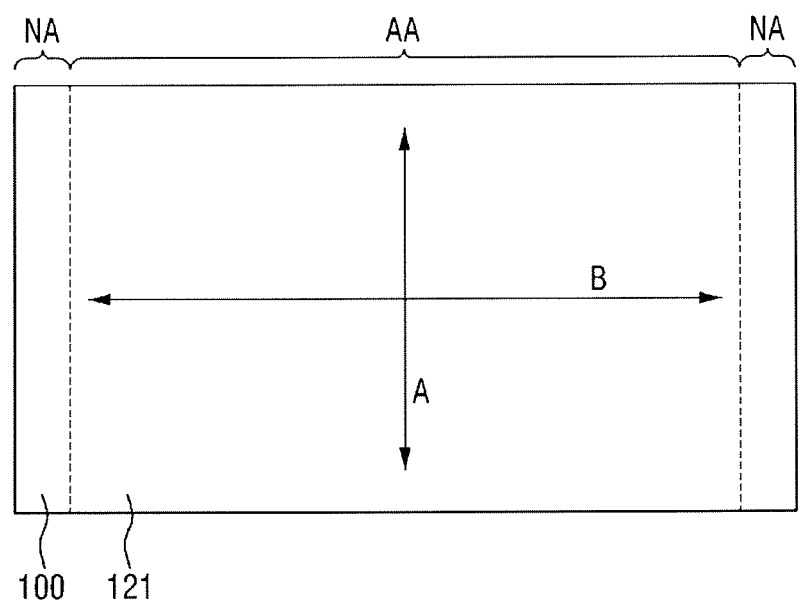
FIG. 16 is a plan view of a polarizer plate according to an embodiment of the present disclosure.

FIG. 16 is a plan view of a polarizer plate according to an embodiment of the present disclosure.

Referring to FIG. 16, the first polarizer 121 may include four sides in a plan view, and the second or projection regions NA of the base film 100 may extend on at least two sides of the first polarizer 121. That is, as illustrated in FIG. 16, the first polarizer 121 may have a rectangular shape with four sides. However, the shape of the first polarizer 121 is not limited thereto, but may change depending on the shape of the horizontal cross-section of the display device to which the polarizer is to be applied.

The base film 100, which includes the projection regions NA as described above, may project on at least two sides, particularly, two opposite sides, of the first polarizer 121. Accordingly, in the case where the polarizer plate is disposed in the display device, the base film 100 may be disposed do that projection regions NA project out from the first polarizer 121 on both sides thereof. Accordingly, the polarizer in the display device can be protected against permeation of oxygen or moisture to improve durability, and the size of the non-display region can be minimized.

On the other hand, in FIG. 16, the direction A may be an absorption side of the polarizer, and the direction B may be a polarization axis of the polarizer. That is, the direction A may be a drawing direction of the polarizer. In this case, the projection regions of the base film 100 may extend from both side surfaces in the direction of the polarization axis B of the polarizer. Since the projection regions extend in the direction of the polarization axis B of the polarizer, i.e., in the direction that is perpendicular to the drawing direction, a polarizer that is positioned on the second region NA can be easily removed when removing other elements on the polarizer plate below the adhesive layer of the second region NA.

In other words, chains of the polarizer may be arranged parallel to the absorption side direction A, which is perpendicular to the polarization axis direction B. In this case, the chain connections in the polarization axis direction B may be disconnected more easily in comparison to the connections in the absorption axis direction A. Accordingly, if the projection regions extend from both side surfaces in the polarization axis direction B, a polarizer that extends into the projection region, i.e., the second region NA, can be easily removed.

Figure 17:
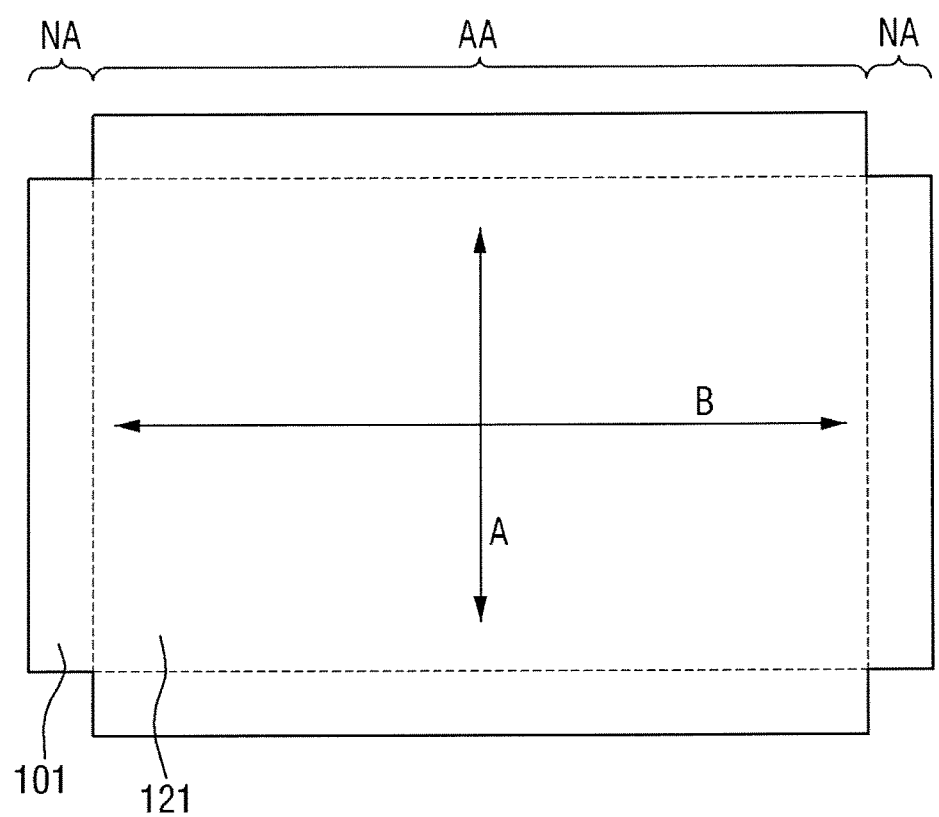
FIG. 17 is a plan view of a polarizer plate according to another embodiment of the present disclosure.

FIG. 17 is a plan view of a polarizer plate according to another embodiment of the present disclosure.

Referring to FIG. 17, the projection regions 101 of the base film may project from four sides of the first polarizer. Accordingly, when a polarizer plate is disposed in a display device, the polarizer inside of the projection regions can be protected against upper, lower, left, and right sides due to the horizontal cross-section of the polarizer plate. Accordingly, durability can be improved, and the size of the non-display region can be minimized.

Figure 18:
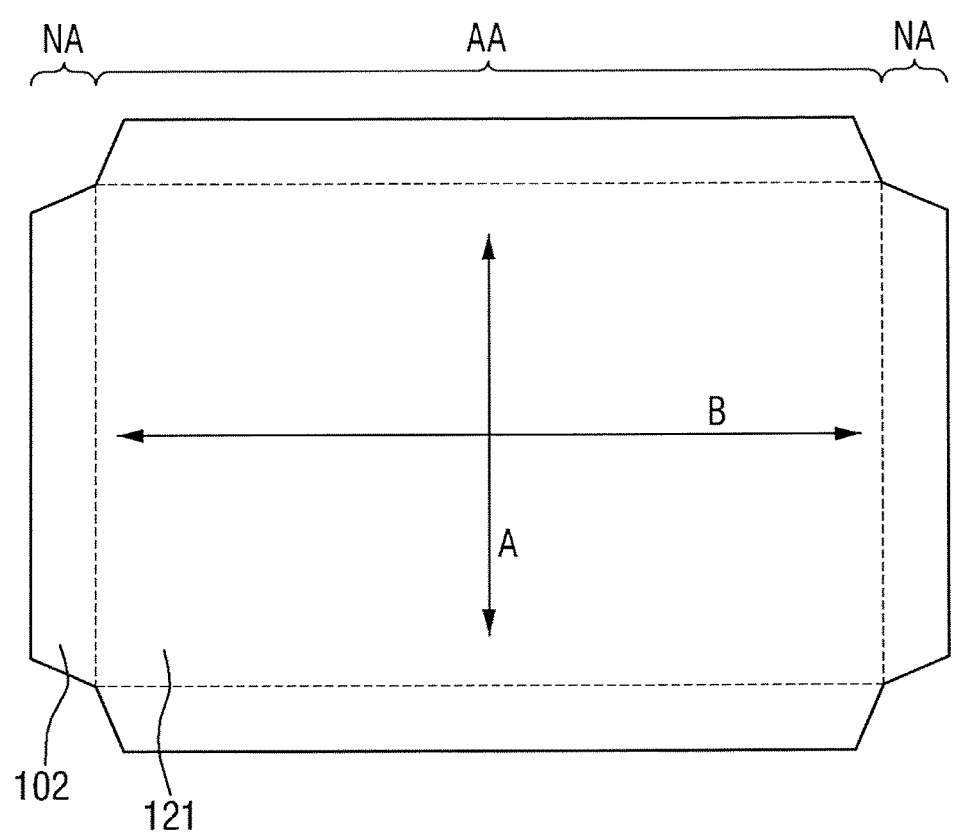
FIG. 18 is a plan view of a polarizer plate according to still another embodiment of the present disclosure.

FIG. 18 is a plan view of a polarizer plate according to another embodiment of the present disclosure.

The polarizer plate of FIG. 18 differs from the polarizer plate of FIG. 17 in that the projection region of the base film 100 of the polarizer plate of FIG. 17 has a rectangular shape, whereas the projection regions 102 of the base film of the polarizer plate of FIG. 18 have a trapezoidal shape. However, the shapes of the projection region are not limited to those as illustrated in FIGS. 17 and 18, but may have various other shapes so that end portions of the projection regions may include curves based on the purpose and shape of the display device or ease of manufacturing.

In addition, embodiments of the present disclosure include a method for manufacturing a polarizer plate, and hereinafter, a method for manufacturing a polarizer plate according to an embodiment of the present disclosure will be described.

A method for manufacturing a polarizer plate may include preparing a polarizer plate that includes a base film, an adhesive layer disposed on one surface of the base film, a polarizer protection film disposed on one surface of the adhesive layer, and a polarizer disposed on one surface of the polarizer protection film; irradiating at least one surface of the polarizer plate with light in a first wavelength range, hereinafter referred to as first wavelength range light; and forming a cutting line perpendicular to a horizontal surface of the base film using first wavelength range light to the polarizer protection film and the polarizer into separate regions. Further, the base film may be formed of a material transparent to first wavelength range light, and the polarizer protection film and the polarizer may be formed of a material that at least partially absorbs first wavelength range light.

The base film may be formed of the material that is substantially transparent to first wavelength range light, but may absorb a part of that light. In this case, the base film may absorb first wavelength range light to the extent that the base film is not entirely cut.

The adhesive layer may be formed of a material that absorbs first wavelength range light. Accordingly, the cutting line may be formed in the adhesive layer, and thus the adhesive layer may be divided into a first adhesive layer and a second adhesive layer by the cutting line.

On the other hand, a method for manufacturing a polarizer plate may further include forming a groove line on at least one surface of the base film by irradiating the at least one surface of the base film with light in a second wavelength range, hereinafter referred to as second wavelength range light, that differs from the first wavelength range. In this case, the base film may be formed of a material that absorbs at least a part of the second wavelength range light.

As the base film absorbs the irradiated second wavelength range light, heat may be generated in the base film to form the groove line, but embodiments are not limited thereto. To form the groove line on the base film, if needed, the base film may absorb a part of the first wavelength range light, the intensity of the first wavelength range light may be increased, or light irradiation time may be increased.

Figure 19:
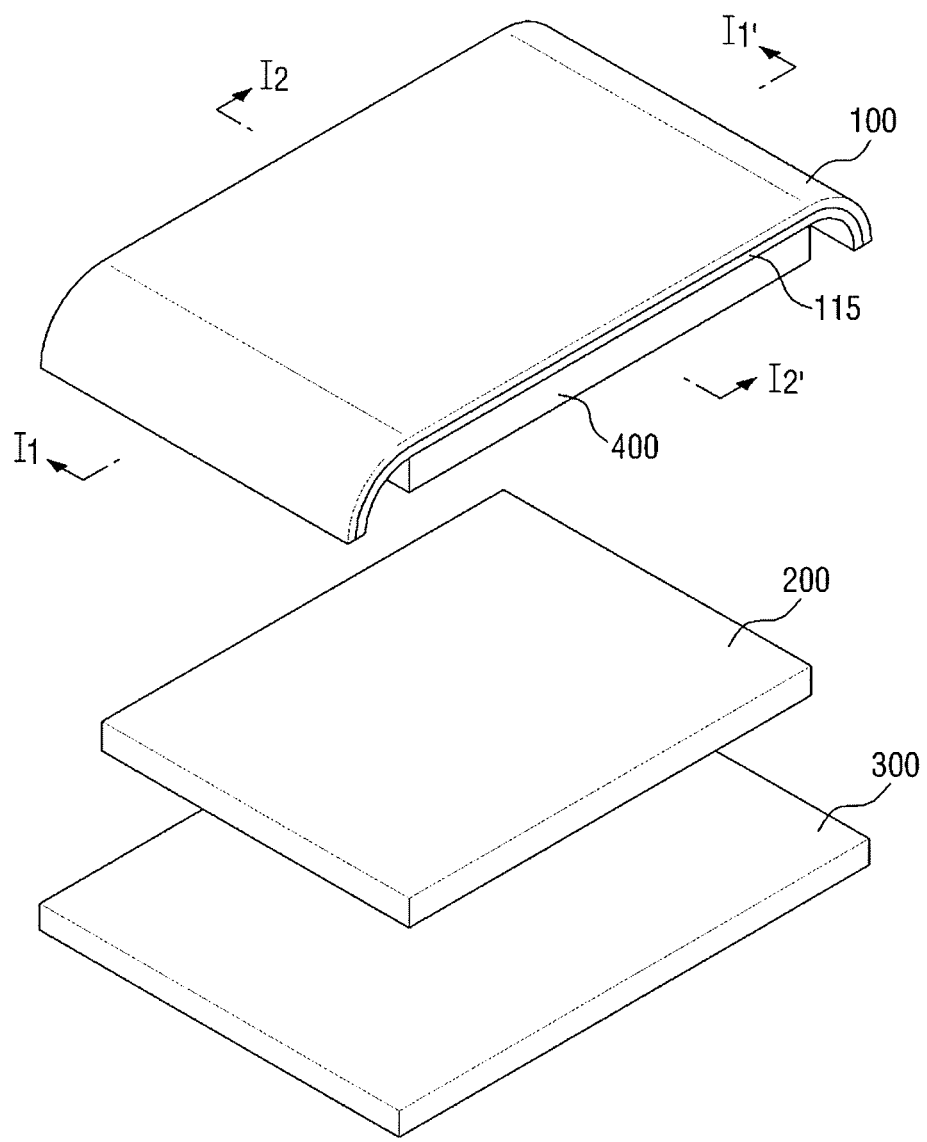
FIG. 19 is an exploded perspective view of a display device according to an embodiment of the present disclosure.
Figure 20:
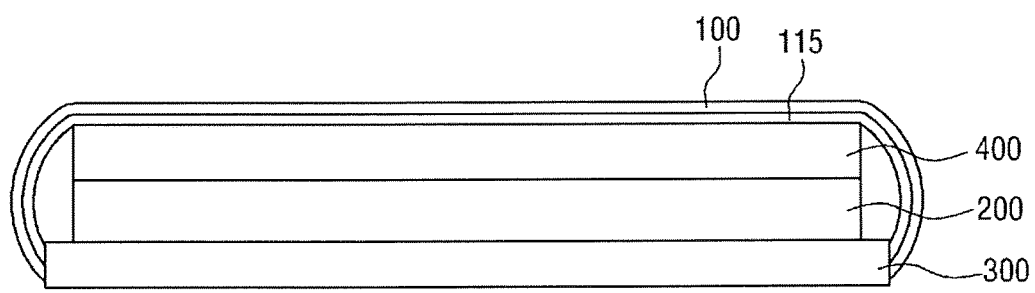
FIG. 20 is a cross-sectional view of the display device of FIG. 19 taken along line I1-I1' of FIG. 19.

FIG. 19 is an exploded perspective view of a display device according to an embodiment of the present disclosure. FIG. 20 is a cross-sectional view of the display device of FIG. 19 taken along line I1-I1' of FIG. 19, and FIG. 21 is a cross-sectional view of the display device of FIG. 19 taken along line I2-I2' of FIG. 19.

Figure 21:
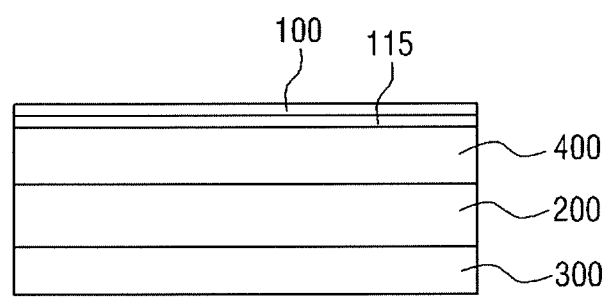
FIG. 21 is a cross-sectional view of the display device of FIG. 19 taken along line I2-I2' of FIG. 19.

Referring to FIGS. 19 to 21, a display device may include a display panel 200 that includes a display region, a polarizer plate 1 positioned on an upper portion of the display panel 200, and a case 300 positioned on a lower portion of the display panel 200 to accommodate the display panel.

As described above, the polarizer plate 1 may include a base film, an adhesive layer disposed on one surface of the base film, a polarizer protection film disposed on one surface of the adhesive layer, and a polarizer disposed on one surface of the polarizer protection film, and the base film may include projection regions that are not covered by the polarizer. Further, the projection regions may extend past side portions of the polarizer protection film and the polarizer. For convenience of explanation, configurations below the adhesive layer 115 that are positioned in a first region of the polarizer plate 1 as described above are commonly called an optical film 400, which includes the polarizer.

As described above, the second polarizer protection film 132 and the second polarizer 122 that are positioned on the adhesive layer 115 in the second region NA of the polarizer plate 1 may be removed from the display device. Accordingly, only the projection regions of the base film 100 and the adhesive layer 115 may remain in the second region NA.

The projection regions of the base film 100 may extend from opposite side surfaces of the base film 100 and may be bent in a direction of the case 300 to be attached to the case 300. The attachment of the base film 100 to the case 300 may be performed using what remains of the adhesive layer 115 on the surface of the projection region of the base film 100, but embodiments are not limited thereto. If needed, addition strong adhesives may be attached thereto.

The case 300 may accommodate the display panel 200, and the display panel 200 may be seated on an upper surface of the case 300 to be accommodated therein. The case 300 may be formed of an insulating material, and, for example, may be formed of a plastic material, but embodiments are not limited thereto. The case may be formed of any suitable material typically used in the art to which the present disclosure pertains. Further, in FIGS. 19 to 21, the case 300 has a flat plate shape, but embodiments are not limited thereto. The case 300 may have various shapes. For example, the case 300 may be engraved to accommodate the elements of the display device, and if the display device further includes a backlight unit, a space for accommodating the backlight unit may be formed in the case 300.

Figure 22:
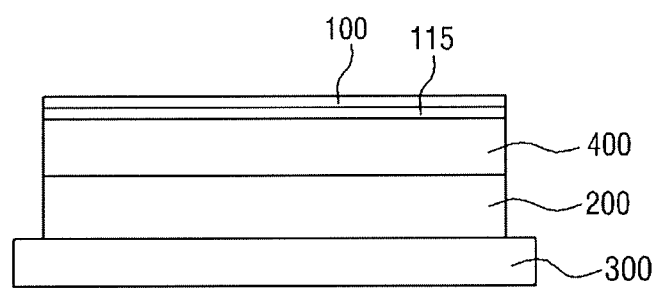
FIG. 22 is a cross-sectional view of the display device of FIG. 19 taken along line I2-I2' of FIG. 19 according to another embodiment of the present disclosure.

The width of the case 300 may be equal to or greater than the width of the display panel 200. That is, as illustrated in FIGS. 20 and 21, the width of the case 300 may be greater than the width of the display panel 200 in one cross-section, and may be equal to the width of the display panel 200 in the other cross-section, but embodiments are not limited thereto. As illustrated in FIG. 22, the width of the case 300 may be greater than the width of the display panel 200 even in the other cross-section.

Referring again to FIGS. 19 to 21, as the width of the case 300 is greater than the width of the display panel 200, the projection region of the base film 100 may be spaced apart from the display panel 200. That is, the display region of the display panel 200 and the polarizer of the polarizer plate may substantially overlap each other, and the projection region of the base film 100 may be positioned outside of the display region of the display panel 200. The projection region of the base film 100 may surround the optical film 400 and may be bent in the direction of the case 300, and the bent portions may overlap the side surfaces of the display panel 200. Accordingly, even without any separate closing process, the polarizer can be protected by the base film 100, and if the width of the case 300 is greater than the width of the display panel 200, the display panel 200 and the projection region of the base film may be spaced apart from each other at predetermined intervals.

In addition, the display panel 200 may be a liquid crystal panel. A liquid crystal panel may have a liquid crystal layer sealed between a first substrate and a second substrate.

The first substrate may be a thin film transistor (TFT) substrate, and may include, for example, a base made of a transparent insulating material, such as glass or plastic, a thin film transistor that is composed of a gate electrode, a gate insulating layer, a semiconductor layer, an ohmic contact layer, and source/drain electrodes, and a pixel electrode formed of a transparent conductive oxide, such as indium tin oxide (ITO) or indium zinc oxide (IZO) that can generate an electric field.

The second substrate may be a color filter (CF) substrate, and may include, for example, a base made of a transparent insulating material, such as glass or plastic, a black matrix formed on a lower surface of the base to prevent light leakage, red, green, and blue color filters, and a common electrode formed of a transparent conductive oxide, such as ITO or IZO that can generate an electric field.

If the display panel 200 is a liquid crystal panel, a lower polarizer plate may be positioned on a lower portion of the liquid crystal panel, and a polarizer plate according to a present disclosure may be disposed on an upper portion thereof. That is, a polarizer plate according to a present disclosure may be disposed on a light emitting side of the display panel 200.

The liquid crystal layer may be a twisted nematic (TN) mode that has positive dielectric anisotropy, a vertical alignment (VA) mode, or a horizontal alignment (in-plane switching (IPS) or fringe-field switching (FFS)) mode.

Since detailed configurations of liquid crystal panels are well known in the art to which the present disclosure pertains, further detailed descriptions thereof will be omitted.

The display panel 200 may be an organic light emitting diode (OLED) panel that includes organic light emitting diodes. An OLED panel may include pixels, and each pixel may be provided with an OLED that is composed of an anode, a cathode, an organic light emitting layer provided between the anode and the cathode, and a pixel circuit for independently driving the OLED. The pixel circuit may include a switching thin film transistor (TFT), a capacitor, and a driving TFT. The switching TFT may charge a data voltage in the capacitor in response to a scan pulse, and the driving TFT may control the amount of current that is supplied to the OLED based on the data voltage that is charged in the capacitor. Accordingly, the amount of light emitted from the OLED may be adjusted, and an image may be displayed.

Further, a polarizing plate according to a present disclosure may be disposed on light emitting side of an OLED panel. Accordingly, contrast deterioration caused by reflection of external light can be prevented.

Since OLED panels are well known in the art to which the present disclosure pertains, further detailed descriptions thereof will be omitted.

The projection regions of the base film 100 may cover the side portions of the display panel 200. For this, the projection regions may be bent in the direction of the case 300. Further, the projection regions of the base film 100 may be attached to the case 300 by the remaining adhesive layer 115 on the second region NA. Since the projection regions of the base film 100 surrounds the optical film 400 and attaches the polarizer plate to the case 300, permeation of moisture or air can be prevented, and a size of the non-display region can be minimized.

Figure 23:
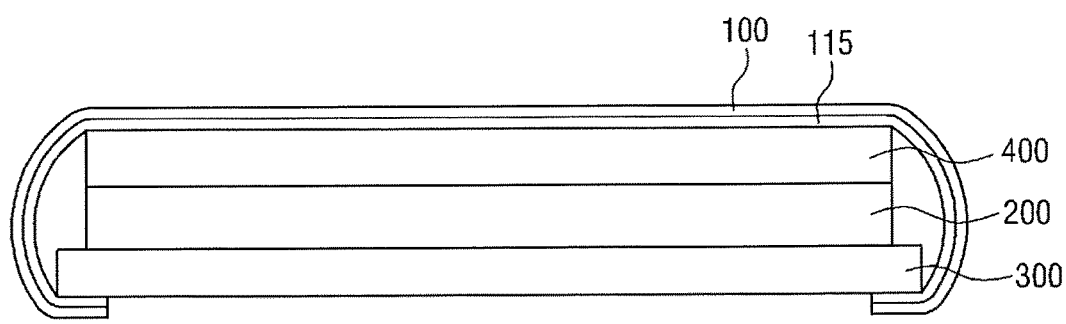
FIG. 23 is a cross-sectional view of the display device of FIG. 19 taken along line I1-I1' of FIG. 19 according to another embodiment of the present disclosure.

FIG. 23 is a cross-sectional view of the display device of FIG. 19 taken along line I1-I1' of FIG. 19 according to another embodiment of the present disclosure.

Referring to FIG. 23, the projection regions of the base film 100 may be attached to the lower surface of the case 300. Since the projection regions are attached to the lower surface of the case 300, durability can be further improved. Since other configurations are substantially the same as those as described above, further duplicate descriptions thereof will be omitted.

Figure 24:
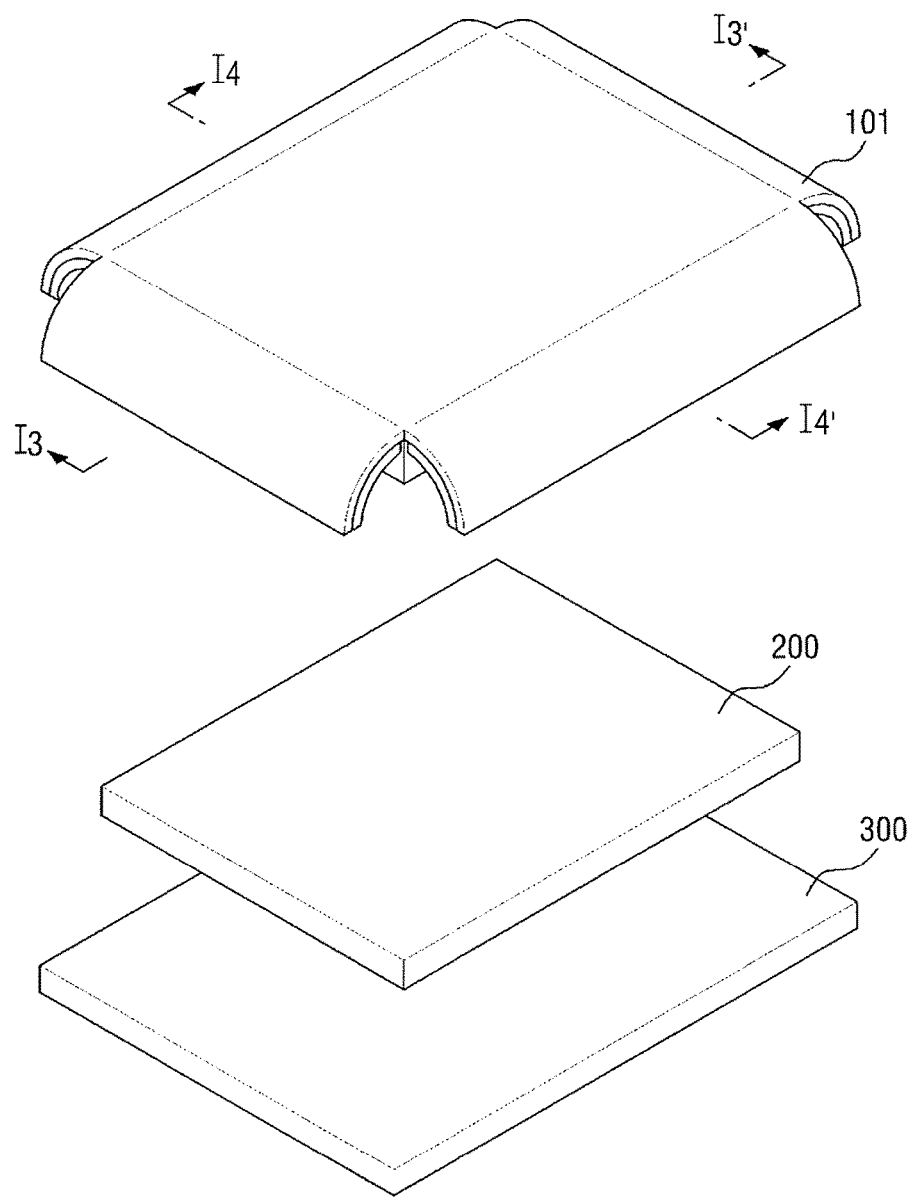
FIG. 24 is an exploded perspective view of a display device according to another embodiment of the present disclosure.
Figure 25:
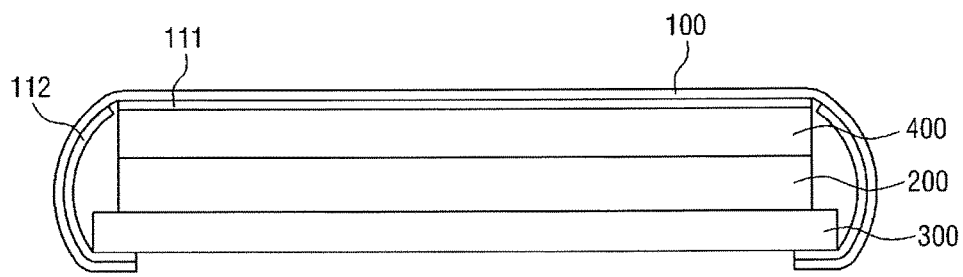
FIG. 25 is a cross-sectional view of the display device of FIG. 24 taken along line I3-I3' of FIG. 24.

FIG. 24 is an exploded perspective view of a display device according to another embodiment of the present disclosure. FIG. 25 is a cross-sectional view of the display device of FIG. 24 taken along line I3-I3' of FIG. 24, and FIG. 26 is a cross-sectional view of the display device of FIG. 24 taken along line I4-I4' of FIG. 24.

Figure 26:
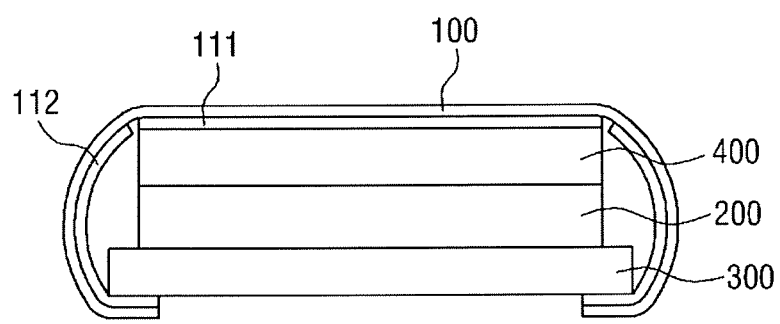
FIG. 26 is a cross-sectional view of the display device of FIG. 24 taken along line I4-I4' of FIG. 24.

Referring to FIGS. 24 to 26, projection regions may extend from four sides of a base film 101. That is, the display device of FIGS. 24 to 26 differs from the display device of FIGS. 19 to 21 in that the projection regions extend from all four sides of the base film 101. In this case, the projection regions that extend from four sides of the base film 101 may be bent toward the case 300 to be attached to the case 300, and which can improve durability. Further, since the four sides of the base film 101 are pulled by the same force, the optical film 400 that is positioned on the base film 101 can be prevented from being twisted.

In addition, as illustrated in FIGS. 25 and 26, the adhesive layer of the base film may be divided into the first adhesive layer 111 and the second adhesive layer 112. That is, the adhesive layer of the base film may be divided so that the first adhesive layer 111 is positioned to overlap the optical film 400 and the second adhesive layer 112 is positioned in the projection region. Since this has been described above with respect to the polarizer plate, a further duplicate description thereof will be omitted.

Figure 27:
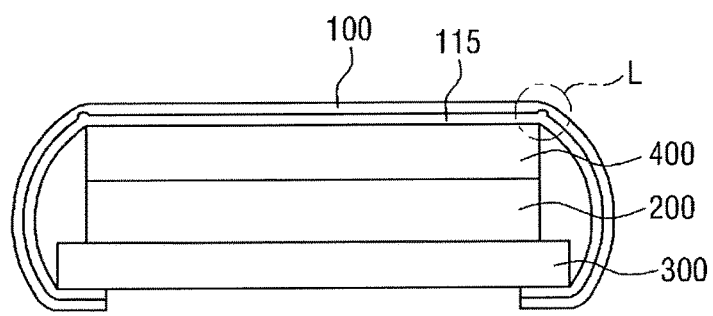
FIG. 27 is a cross-sectional view of the display device of FIG. 24 taken along line I4-I4' of FIG. 24 according to another embodiment of the present disclosure.
Figure 28:
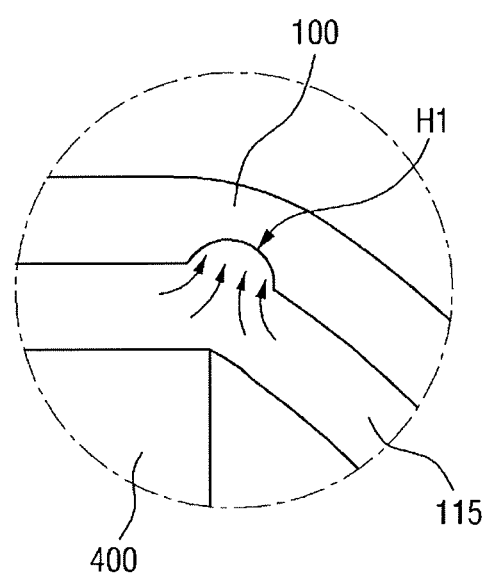
FIG. 28 is an enlarged cross-sectional view of a portion L of the display device of FIG. 27.

FIG. 27 is a cross-sectional view of the display device of FIG. 24 taken along line I4-I4' of FIG. 24 according to another embodiment of the present disclosure, and FIG. 28 is an enlarged cross-sectional view of a portion L of the display device of FIG. 27. Referring to FIGS. 27 and 28, the adhesive layer 115 may not be divided, unlike the adhesive layer illustrated in FIG. 26. Further, the display device of FIGS. 27 and 28 may further include a groove line H1 formed on at least one surface of the base film 100 and that overlaps the side wall of the display panel 200. The projection regions of the base film 100 may be bent 300 around the groove line H1 as a boundary toward the case.

As described above with respect to the polarizer plate, the groove line H1 may be formed in one surface or in both surfaces of the base film 100, and thus the projection regions of the base film 100 can be easily bent toward the case 300. Further, as illustrated in FIG. 28, when the projection region of the base film 100 is bent, a part of the adhesive layer 115 may be pushed into the groove line H1, and thus the polarizer plate can be more easily attached to the display panel 200.

Although exemplary embodiments of the present disclosure have been described for illustrative purposes, those skilled in the art will appreciate that various modifications, additions and substitutions are possible, without departing from the scope and spirit of embodiments of the disclosure as recited in the accompanying claims.

What is claimed is:

1. A display device comprising:
a display panel that includes a display region;
a polarizer plate positioned on an upper portion of the display panel;
a case positioned below the display panel to accommodate the display panel; and
a groove line in at least one surface of the base film opposite from a side wall of the display panel,
wherein the polarizer plate includes a base film, an adhesive layer disposed on the base film, a polarizer protection film disposed on a surface of the adhesive layer opposite from the base film, and a polarizer disposed on a surface of the polarizer protection film opposite from the adhesive layer, wherein the base film includes projection regions that extend out from a region covered by the polarizer,
wherein the projection regions of the base film are bent around the groove line as a boundary toward the case, and
wherein the projection regions cover side portions of the polarizer protection film and the polarizer.

2. The display device of claim 1, wherein the projection regions cover side portions of the display panel.

3. The display device of claim 1, wherein the projection regions are attached to the case.

4. The display device of claim 3, wherein the base film is attached to the case by the adhesive layer on the projection regions.

5. The display device of claim 1, wherein the projection regions are attached to a lower surface of the case.

6. The display device of claim 1, wherein the projection regions are spaced apart from the display panel.

* * * * *